(12) United States Patent
Gongwer

(10) Patent No.: US 6,250,211 B1
(45) Date of Patent: Jun. 26, 2001

(54) BARBECUE ASSEMBLY WITH LATERALLY MOVABLE SPIT ARM

(75) Inventor: Troy W. Gongwer, Wakarusa, IN (US)

(73) Assignee: Nelgo Manufacturing, Inc., Wakarusa, IN (US)

( * ) Notice: Subject to any disclaimer, the term of this patent is extended or adjusted under 35 U.S.C. 154(b) by 0 days.

(21) Appl. No.: 09/576,335

(22) Filed: May 22, 2000

Related U.S. Application Data

(60) Provisional application No. 60/135,408, filed on May 21, 1999.

(51) Int. Cl.$^7$ ............... A47J 37/00; A47J 37/04; A47J 37/07
(52) U.S. Cl. ............ 99/340; 99/419; 99/421 H; 99/421 HH; 99/421 HV; 99/427; 99/448
(58) Field of Search ............. 99/330, 339, 340, 99/352–355, 419–421 V, 444–450, 481, 482, 477–479; 126/25 R, 9 R

(56) References Cited

U.S. PATENT DOCUMENTS

| | | |
|---|---|---|
| 1,976,989 | 10/1934 | Grimes . |
| 2,004,775 | 6/1935 | Wright . |
| 2,164,072 | 6/1939 | Kitzeman . |
| 2,182,225 | 12/1939 | Garvis . |
| 2,762,293 * | 9/1956 | Boyajian ............... 99/421 P |
| 2,785,624 | 3/1957 | Brittain . |
| 2,885,951 | 5/1959 | Wolske . |
| 3,196,776 * | 7/1965 | Norton ................. 99/421 P |
| 3,218,958 | 11/1965 | Reynolds . |
| 3,901,136 * | 8/1975 | Wilson et al. ............. 99/446 |
| 3,951,052 * | 4/1976 | Ringo ...................... 99/427 |
| 4,061,083 | 12/1977 | Caliva . |
| 4,177,721 | 12/1979 | Redhead . |
| 4,470,343 * | 9/1984 | Didier ...................... 99/448 |
| 4,505,195 * | 3/1985 | Waltman ................... 99/449 |
| 4,549,476 * | 10/1985 | Langen ...................... 99/450 |
| 4,572,062 | 2/1986 | Widdowson . |
| 4,688,477 * | 8/1987 | Waltman ................... 99/449 |
| 4,723,482 * | 2/1988 | Weiss et al. ............... 99/427 |
| 4,787,302 * | 11/1988 | Waltman et al. ........... 99/427 |
| 5,158,066 * | 10/1992 | Dodgen ..................... 99/446 |
| 5,184,540 * | 2/1993 | Riccio ................. 99/421 H |
| 5,431,093 * | 7/1995 | Dodgen ..................... 99/427 |

* cited by examiner

Primary Examiner—Timothy F. Simone
(74) Attorney, Agent, or Firm—James D. Hall; Ken C. Decker

(57) ABSTRACT

A barbecue mechanism according to the present invention includes a lower casing member enclosing the heating medium for the cooking process. A gear driven spit arm is located above the cooking area, and is movable from a rearward position over the cooking area outwardly by way of linkage arms, to a position proximate outer side of the lower casing member. In this manner, food to be cooked can be loaded on the spit arm for the cooking process. A multi-part cover is also included, which includes a fixed portion mounted to the lower casing member, and a pivotable portion which pivots relative to the fixed portion and defines an opening into which the spit arm rotates when it is in its fully forward position.

24 Claims, 10 Drawing Sheets

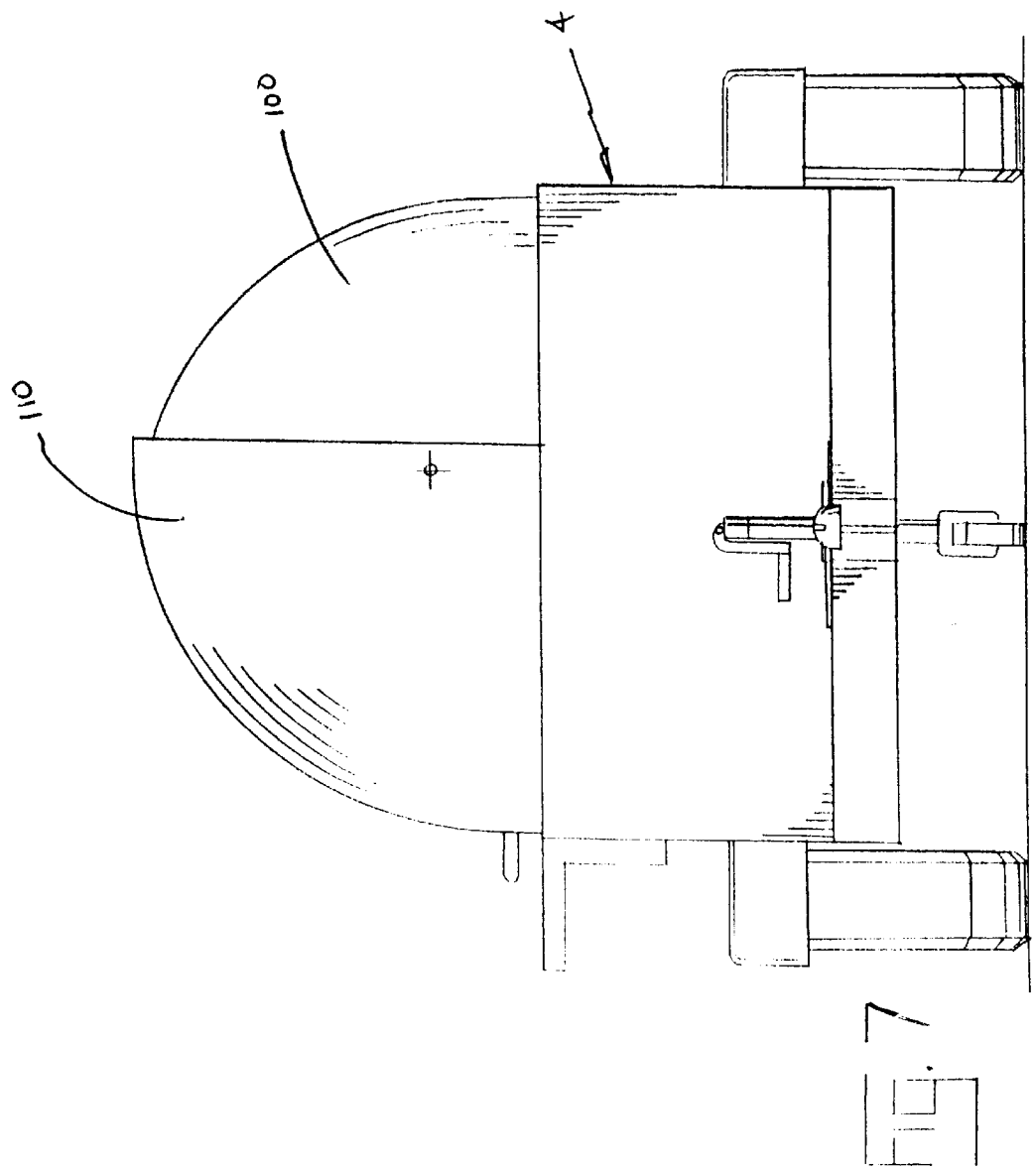

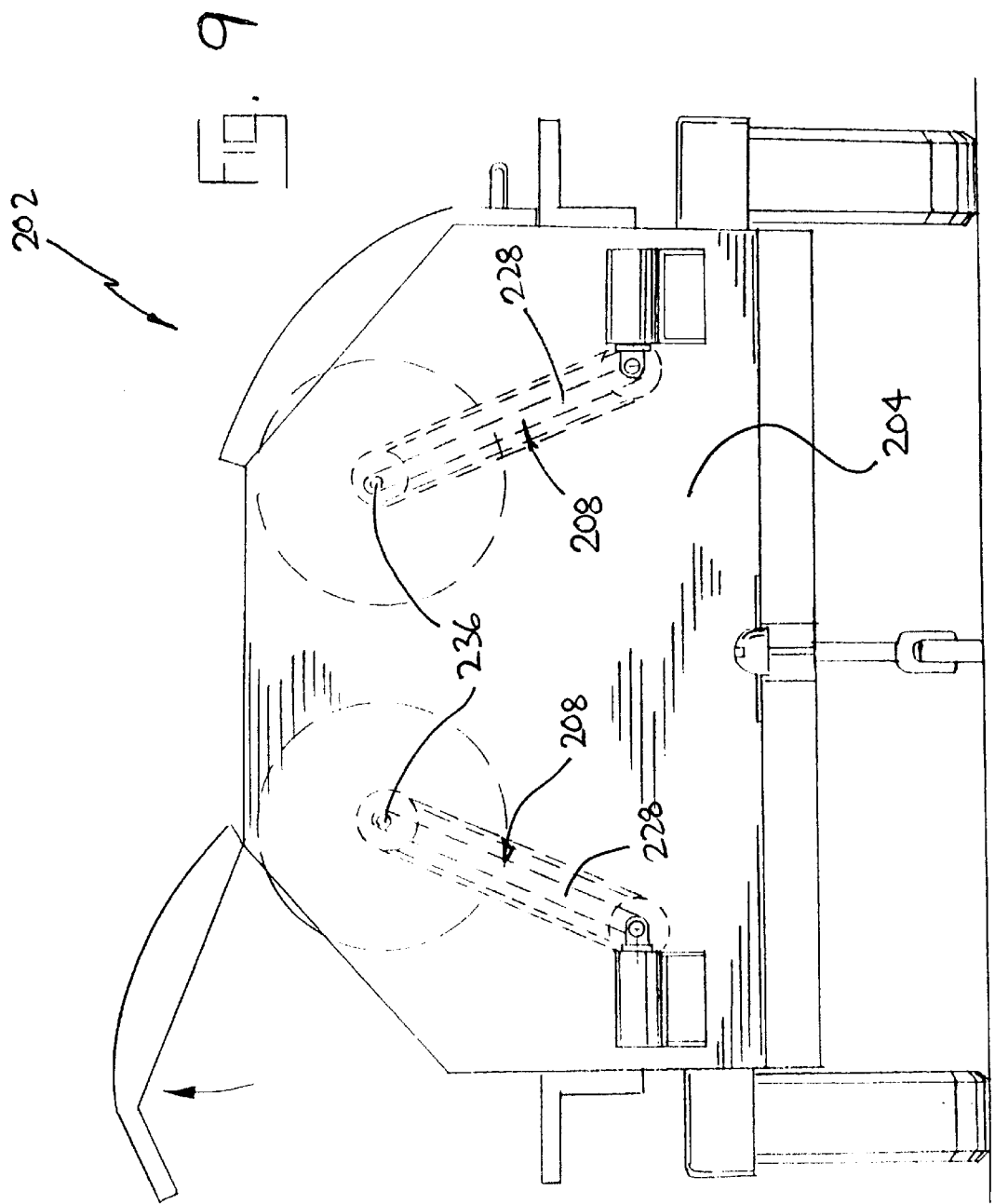

BARBECUE ASSEMBLY WITH LATERALLY MOVABLE SPIT ARM

This Application claims priority from U.S. Provisional Application No. 60/135,408 filed May 21, 1999.

BACKGROUND OF THE INVENTION

1. Field of the Invention

The invention is directed to a barbecue assembly, and in particular, to an assembly which has a driven spit arm for receiving food to be cooked, where the spit arm is laterally movable towards an open side of the barbecue.

2. Discussion of the Prior Art

In commercially sized barbecue units, the units generally include a lower casing member or chamber, which contains the heating medium for the cooking, normally propane gas burners in the larger units. These units also include a spit arm for holding the food to be cooked, which is generally a rod rotatably fixed to the unit. The unit also includes a drive mechanism which imparts rotational movement to the spit arm, to turn the food during the cooking phase. Finally, a cover member is normally included which covers the entirety of the open cooking area, so as to keep the heat and moisture in the unit for best cooking results.

Normally, such food items as whole pigs, or chickens, are cooked on the barbecue units. It is not uncommon to have large cooking areas for such barbecues; and given the weight of the good to be placed on the spit arms, it is oftentimes quite difficult to hold the food items, while leaning over the cooking area to add the food items to the spit arm. It should also be noted that the open surface area is quite hot due to the heating medium, which can become quite uncomfortable for the person or persons operating the barbecue. Such a movement is also ergonomically discomforting, as the person is holding great weight while leaning over the barbecue in an attempt to add the food to the spit arm.

One of the ancillary difficulties or shortcomings of the above mentioned unit is that the covers to such units are relatively large and cumbersome also, in that they must cover the entire open area of the cooking unit when closed, but must also access the spit arm when open, so that the food items can be added to the spit arm as mentioned above. Thus, these covers are relatively heavy to open, which simply intensifies the entire operation of the application to be accomplished.

These and other shortcomings in the industry are intended to be resolved by the present invention.

SUMMARY OF THE INVENTION

The above mentioned objects of the invention have been accomplished by providing a barbecue rotisserie assembly, comprising a lower casing member, a spit arm profiled for receiving food to be cooked, and a drive mechanism which imparts rotational movement to said spit arm along its longitudinal axis, so as to rotate said food while cooking. In the present invention however, the spit arm is movable in a direction transverse to the longitudinal axis, between a loading position and a cooking position.

In this manner, by having the spit arm movable transverse to the longitudinal direction, the spit arm can move away from the center of the grilling area to a position which is more convenient to the person(s) operating the grilling. As such, the spit arm moves towards the side where the person (s) stand to operate the barbecue, which reduces, if not eliminates the requirement of the person to lean over the grilling area to add food to be cooked onto the spit arm.

In another aspect of the invention, the barbecue assembly comprises a lower casing member profiled for containing the heating medium for the cooking process, a rotatable spit arm profiled for receiving food to be cooked, and a cover member profiled to enclose said casing for proper cooking conditions. The lower casing member has a front side accessible to the rotatable spit arm, with the cover member comprising, a first rearwardly disposed and relatively fixed section, and a second rotational section adjacent said front side, rotatable to access a food loading area. The spit arm is movable towards the front side into the food loading area for loading the food, and rearwardly away from the front side into a cooking position.

In this manner, a more ergonomic cooking cover or hood is possible. Due to the movable spit arm moving adjacent to the front side of the assembly, the food loading area is also moved towards the front side. This allows that the cover or hood need not open the entire area, but rather, need only open to expose the cooking area. Thus the cover can be comprised of a fixed half and a movable half where the movable half is easier to open ergonomically, than if it were a full cover spanning the entire open barbecue area. In the preferred embodiment of the invention, the second rotatable section is mounted relative to a pivot axis, such that upon opening movement, the weight distribution relative to the pivot axis changes to ease the opening movement, the further that second section is moved.

BRIEF DESCRIPTION OF THE DRAWINGS

The preferred embodiment of the invention will now be described with relation to the following drawings, where:

FIG. 7 shows the spit arm in the position of FIG. 6, with the cover fully rotated downwardly;

FIG. 9 shows a double barbecue mechanism.

DETAILED DESCRIPTION OF THE PREFERRED EMBODIMENT

Figure 1:
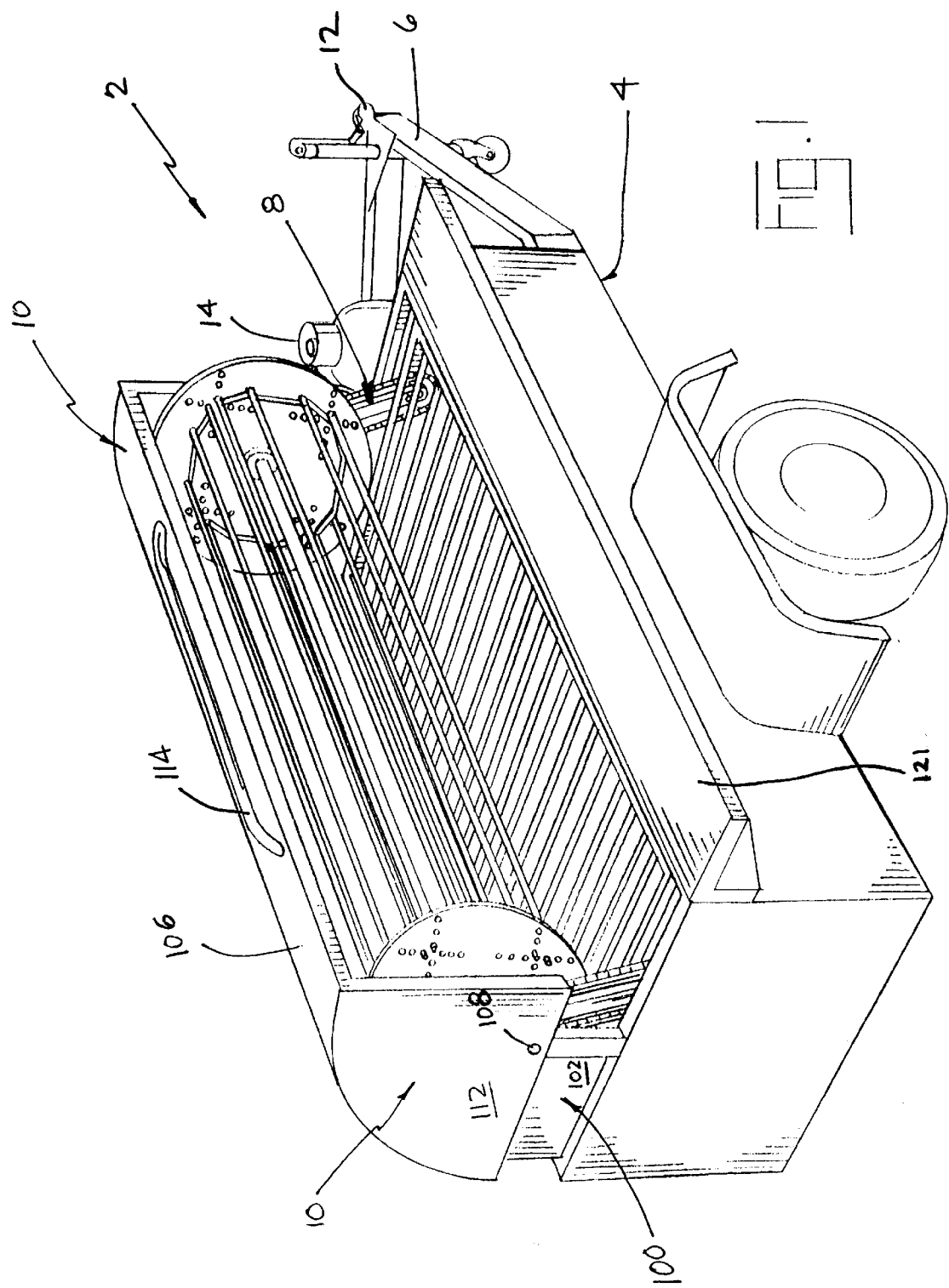
FIG. 1 shows a perspective view of the preferred embodiment of the barbecue assembly according to the invention.
Figure 2:
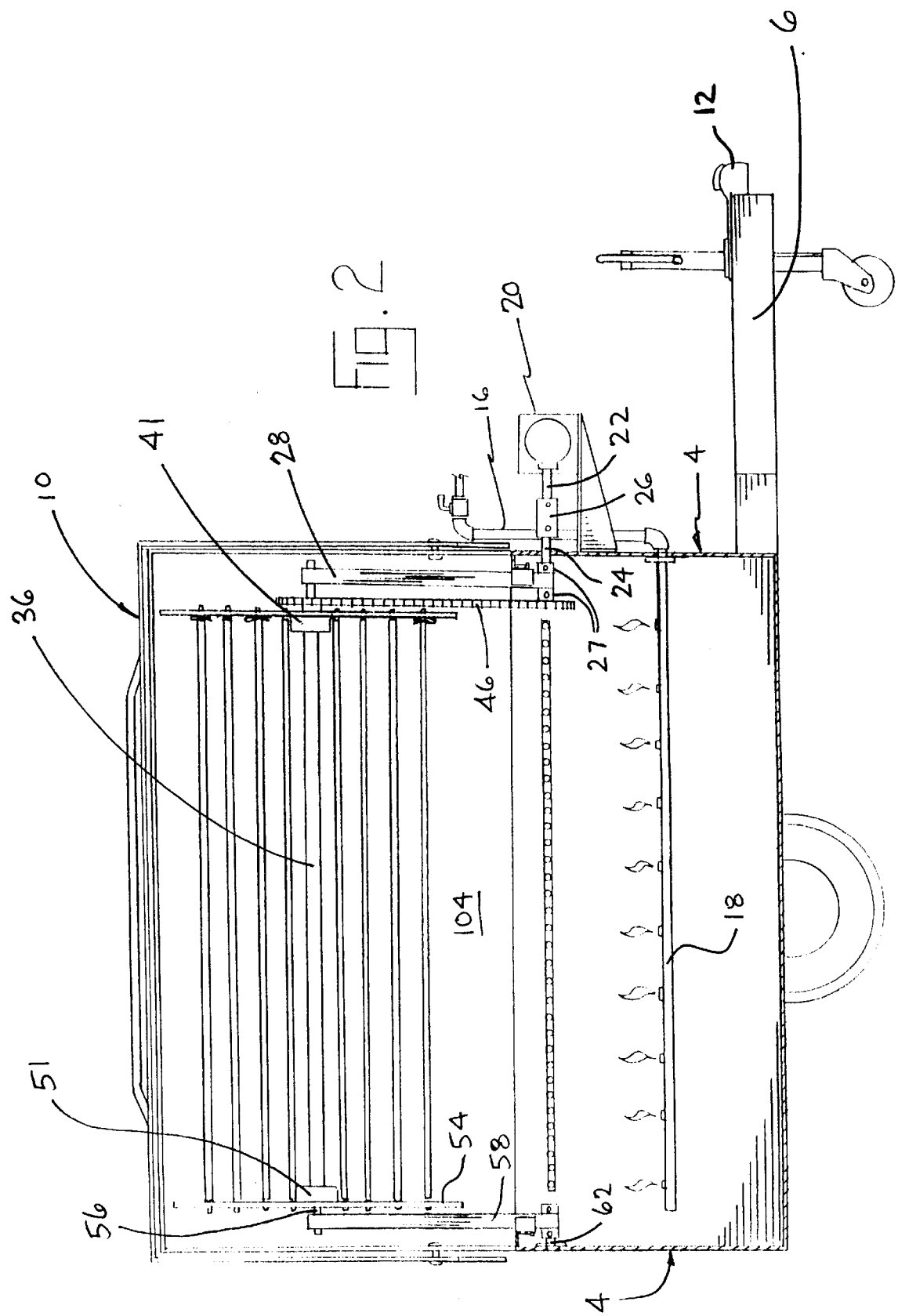
FIG. 2 shows a front plan view of the invention of FIG. 1 with the cover open.
Figure 3:
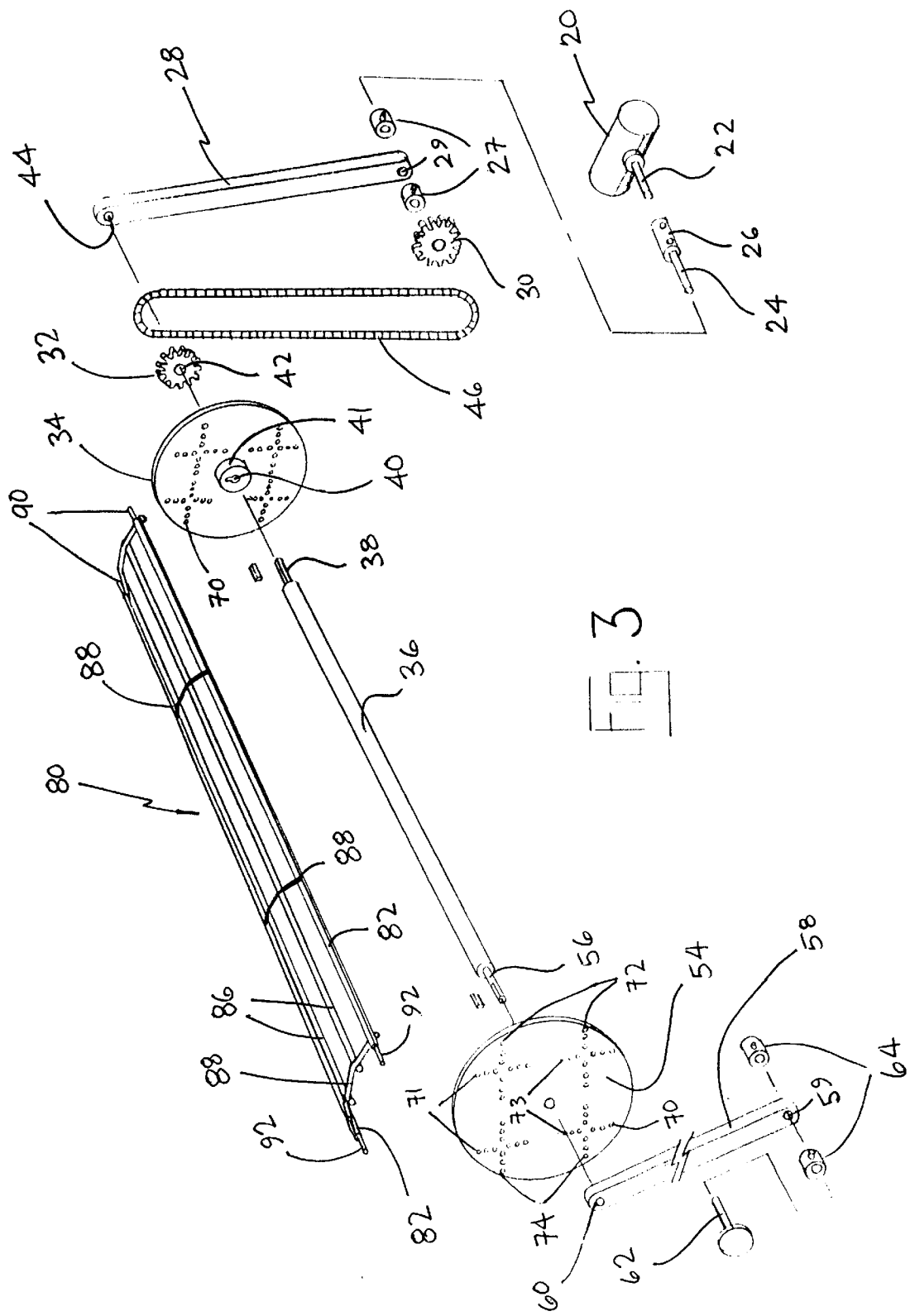
FIG. 3 is a exploded view of the drive train and rotisserie assembly.

With reference first to FIG. 1, a barbecue mechanism according to the preferred embodiment is shown generally at 2 which will comprise a barbecue lower casing 4, a towing mechanism 6, a barbecue spit and drive assembly 8, and a cover 10. It should be appreciated that the barbecue mechanism 2 is of the type which can be towed to various fairs and festivals by way of the towing mechanism 6 which has a hitch mechanism at 12 for connection to a hitch ball assembly of a towing vehicle (not shown). It should also be appreciated that the barbecue mechanism will include some type of heating and cooking mechanism, and in the preferred embodiment will include a propane fueled barbecue mechanism and therefore includes a propane tank such as 14. Furthermore, as shown in FIG. 2 the barbecue mechanism 2 includes appropriate plumbing hardware 16 to deliver the propane gas from the tank 14 to the various burners such as 18. With reference now to FIGS. 2 and 3, the drive mechanism will be described in greater detail.

With respect first to FIG. 2, the drive function emanates from a motor at 20 which delivers an output to its corresponding shaft at 22. The shaft 22 is thereafter coupled to a drive shaft at 24 being connected by a coupling at 26. As shown in FIG. 2, the drive shaft 24 extends through the barbecue casing 4 to an interior thereof. The drive shaft 24 thereafter extends through the barbecue casing 4 to an interior thereof. The drive shaft 24 thereafter extends through two collet members 27, through a linkage arm 28 and to a gear 30. It should be appreciated that the drive shaft 24 is either keyed or splined to the gear 30, but that the drive shaft 24 is not fixed to the link arm 28 but rather, the drive shaft 24 forms the pivot point, for the link arm 28. As shown in FIG. 3, a gear member 32 and a cooking plate 34 are keyed to a spit arm 36 where a shaft end 38 extends through an opening 40 of the cooking plate 34 and through an opening 42 of the gear 32, yet is free to rotate within an opening or rotation point 44 of the link rod 28. A chain member 46 extends around the gear members 30 and 32 to impart rotational movement from the motor to the gear member 32, and thereafter to the spit arm 36. As shown in FIG. 2, a second collet 51 is fixed to a second cooking plate 54 in a similar manner as described above, where the collet 51 has an opening therethrough for receiving shaft end 56; with the shaft end 56 thereafter extending through an aperture 60 in a link arm 58. The link rod 58 is similar to link rod 28, in that it is pinned to a pivot rod 62 to the other side of the barbecue casing 4 and further includes two collets 64 flanking the pivot rod 58 to retain it to the pivot rod 62. It should be appreciated that the pivot rod 62 could be fixed to the inside surface of the lower casing member 4 in any known manner, for example, by welding or through the use of fasteners.

With reference now to FIG. 3, the grill end plates 34 and 54 will be described in greater detail as it relates to their structure. Each of the plates 34 and 54 includes a plurality of aperture at 70 where four sets of columns of apertures 71–74 are arranged on the plates 34 and 54, the sets of columns taking on a substantial cruciform shape. The exact position of the apertures and its operation will be described in greater detail as it relates to the application and operation of the barbecue mechanism. As also shown in FIG. 3, a cooking grate 80 is shown which includes two end rods 82 and 86 in a transverse manner. The end rods 82 include free end portions 90 and 92 which extend beyond the last transverse strap portion, for insertion into desired pairs of apertures 70.

Finally, as shown in FIG. 1, the cover member 10 is comprised f a fixed portion 100, which is defined as a substantial quarter cylinder shape having quarter section end plates 102, and a substantial cylindrical fixed cover portion 104 (FIG. 2) attached to the quarter section end plates 102. The cover assembly 10 further comprises a movable cover part or unit 110 which also includes a quarter section end plates 112, which is also interconnected to a quarter cylindrical shape shall member 1056, where the entire unit 110 is rotatably pinned at 108 to the end plates 102. For ease of movement, the cover section 110 includes a handle 114. It should be appreciated that the location where cover member 110 is pinned at point 108 is such that the weight distribution of the cover makes it easily rotatable about the pivot point.

With the barbecue mechanism 2 as described above, the operation and application of the mechanism will be described now in greater detail. With the motor assembly as described above, it should be appreciated that the motor shaft 22 will drive hear member 30 which will in turn drive gear 42 via the chain member 46. As gear member 32 is keyed to both the plate 34 and to the rod 36, the motor will drive the spit arm 36. This driving motion will in turn also drive the opposite end plate 54 and the two end plates together 34, 54 will cause the rotation of the individual cooking grates 80. It should be understood that the end plate 34, while keyed o the spit arm 36 and to gear 32, is free to rotate about point 44. Likewise, plate 54 is keyed to the spit arm 36, but is free to rotate about its pivot point 60. It should also be appreciated that the link arms 28 and 58, while rotatable about the respective pins 24 and 62 through the corresponding bearing surfaces 29 and 59, they are to driven by the rod 24 and therefore can be pivoted about the rod 24 and 62 from and between the positions of FIGS. 5 and 6. Thus as shown in FIGS. 2 and 5, the linkage arms 28 and 58 can rotate between respective stop surfaces 66 and 68.

Figure 5:
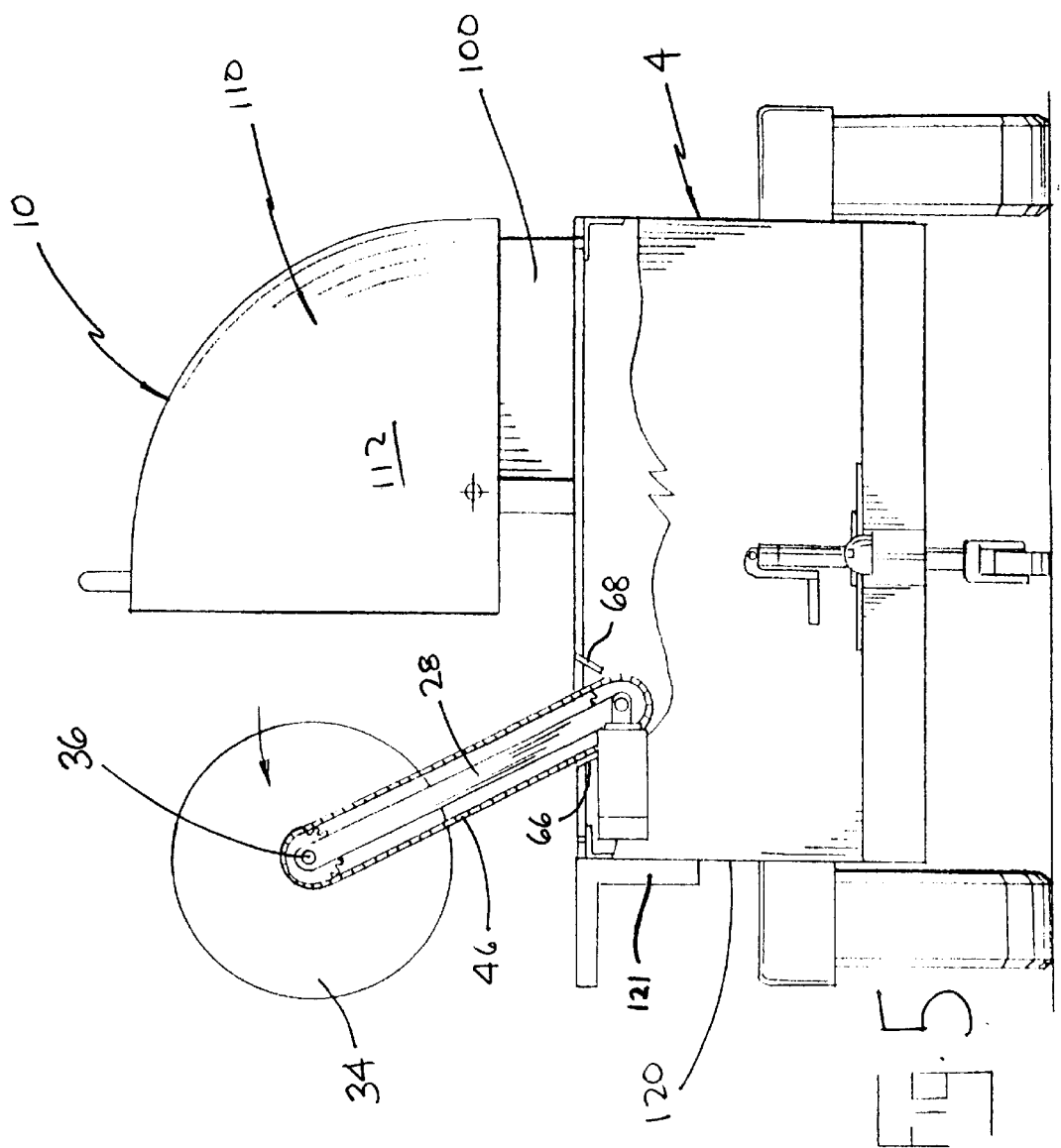
FIG. 5 is a side plan view showing the spit arm rotated to its fully outward position, with the cover open.
Figure 6:
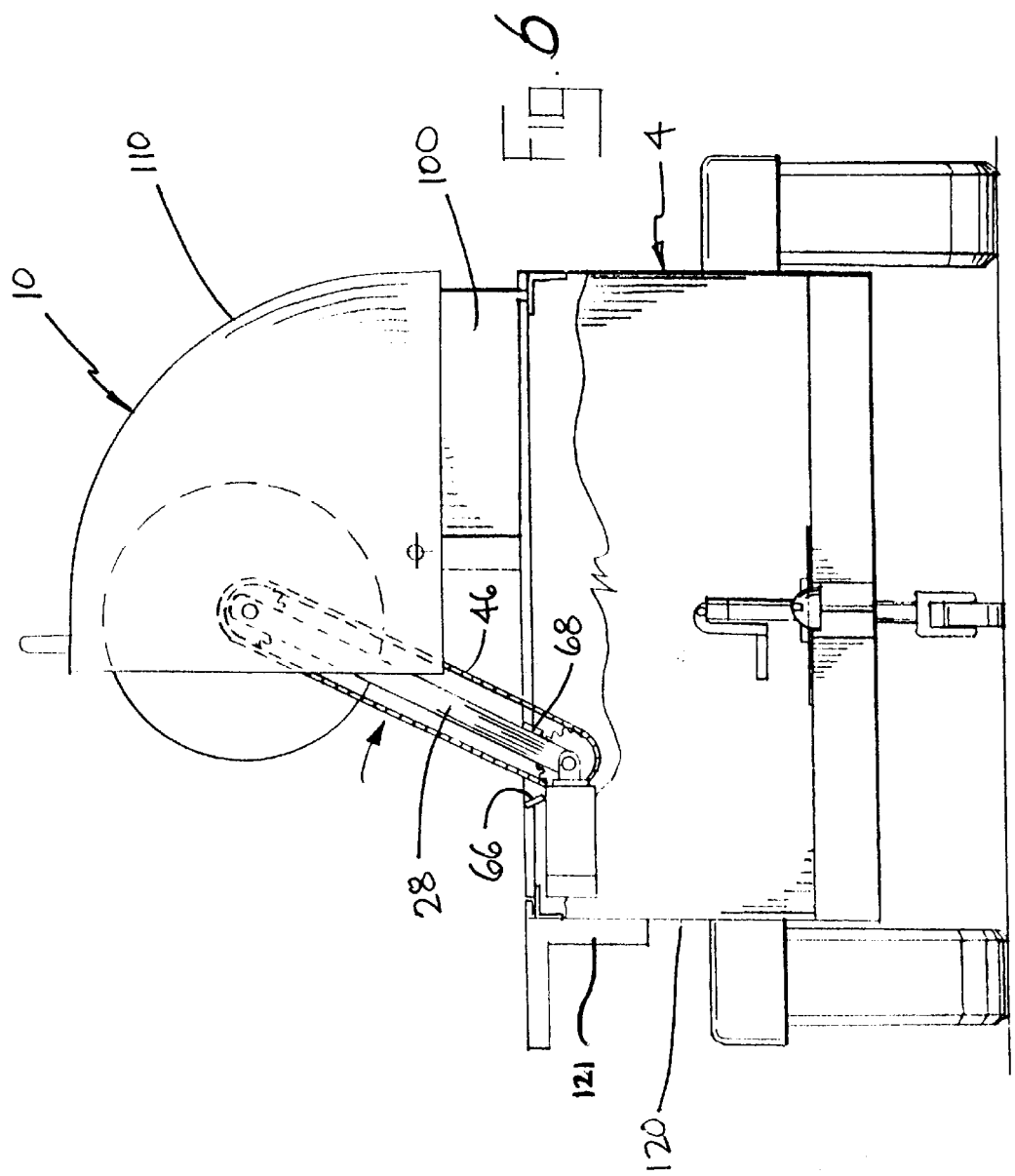
FIG. 6 shows the spit arm rotated back into the barbecue mechanism.

As mentioned above, the linkage arms 28 and 58 are movable between the cooking position of FIG. 6, to the loading position of FIG. 5, by manual rotation of the linkage arms 28 and 58, which pivots the linkage arms about their respective pins at 24 and 62 to move the spit arm 36 and associated cooking end plates 34 and 54 towards a front side 120% the lower casing member 4. In the position shown in FIG. 5, with the linkage arms 28 and 58 fully rotated towards the front side, the operator, who also stands at the front side can easily load food to be cooked. A shelf 121 is mounted to front side 120 of casing member 4 to serve as an aid for holding and loading the food. With respect to FIG. 3, it should be appreciated that the distance between adjacent rod ends 92 and adjacent rods 90 is dimensioned to fit in opposed apertures 70 in the same set of columns 71–74. Said differently, the cooking grates 80 can be placed in each of the columns 71–74 at various distances from the center of the plates 34 and 54.

Figure 4:
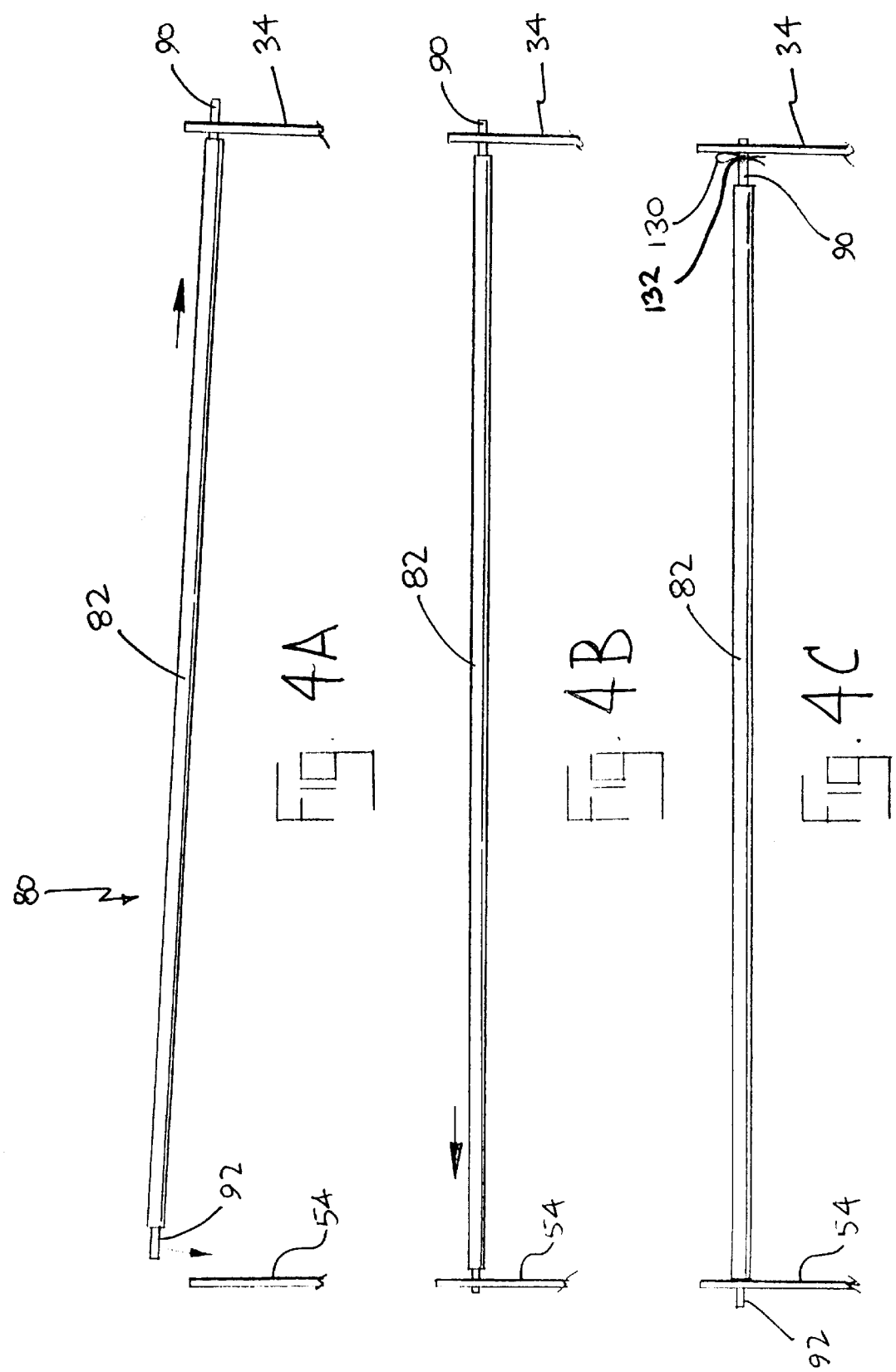
FIGS. 4A–4C are diagrammatical views of the assembly of cooking grates.

With respect now to the diagrammatical views of FIGS. 4A–4C, the cooking grates 80 are positioned and affixed to the plates 34 and 54 as follows. As shown in FIG. 4A, the pin members 90 can be positioned in their respective apertures 70 in the plate 34, and as configured, will allow the pin ends 92 to now clear the inside of plate 54 to be aligned with apertures 70 in plate 54. This allows the cooking grate 80 to be moved leftwardly as viewed in FIG. 4B, to a position where a fastener such as a cotter pin 130 can be positioned in a respective aperture 132 as shown in FIGS. 4C. It should be appreciated from a review of FIGS. 3, and 4A–4C, that the cooking grates will be positioned in corresponding sets of apertures 71–74, for the retention of the food to be cooked.

Figure 8B:
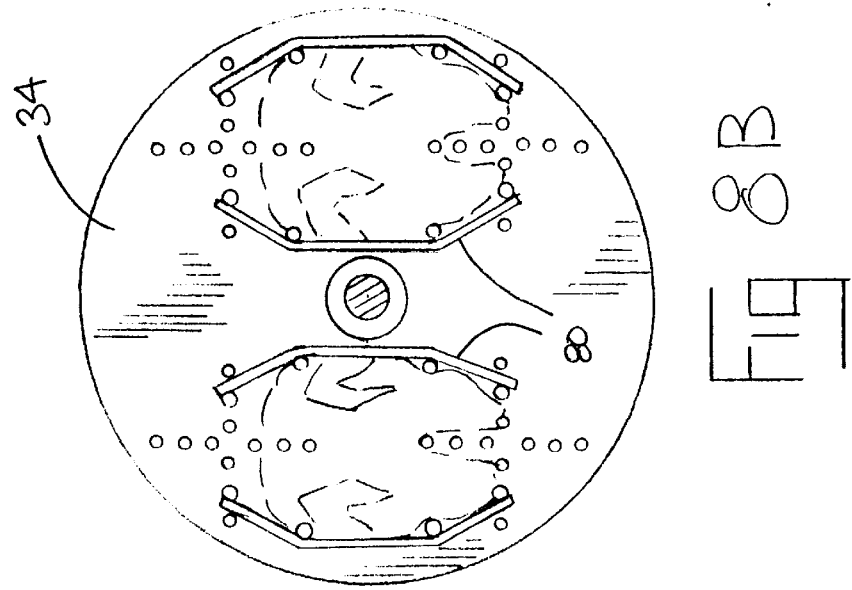
FIGS. 8A–8c shows the location of the cooking grates relative to the spit arm assembly with various types of food to be cooked.
Figure 8A:
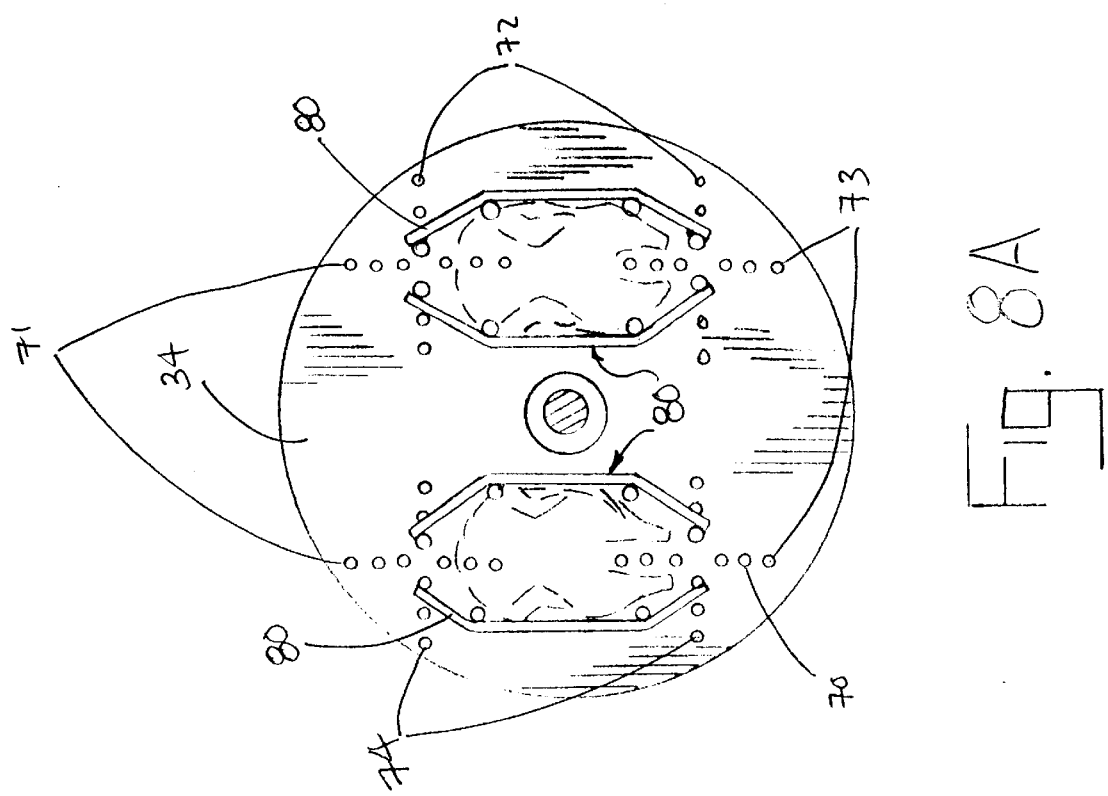
Figure 8C:
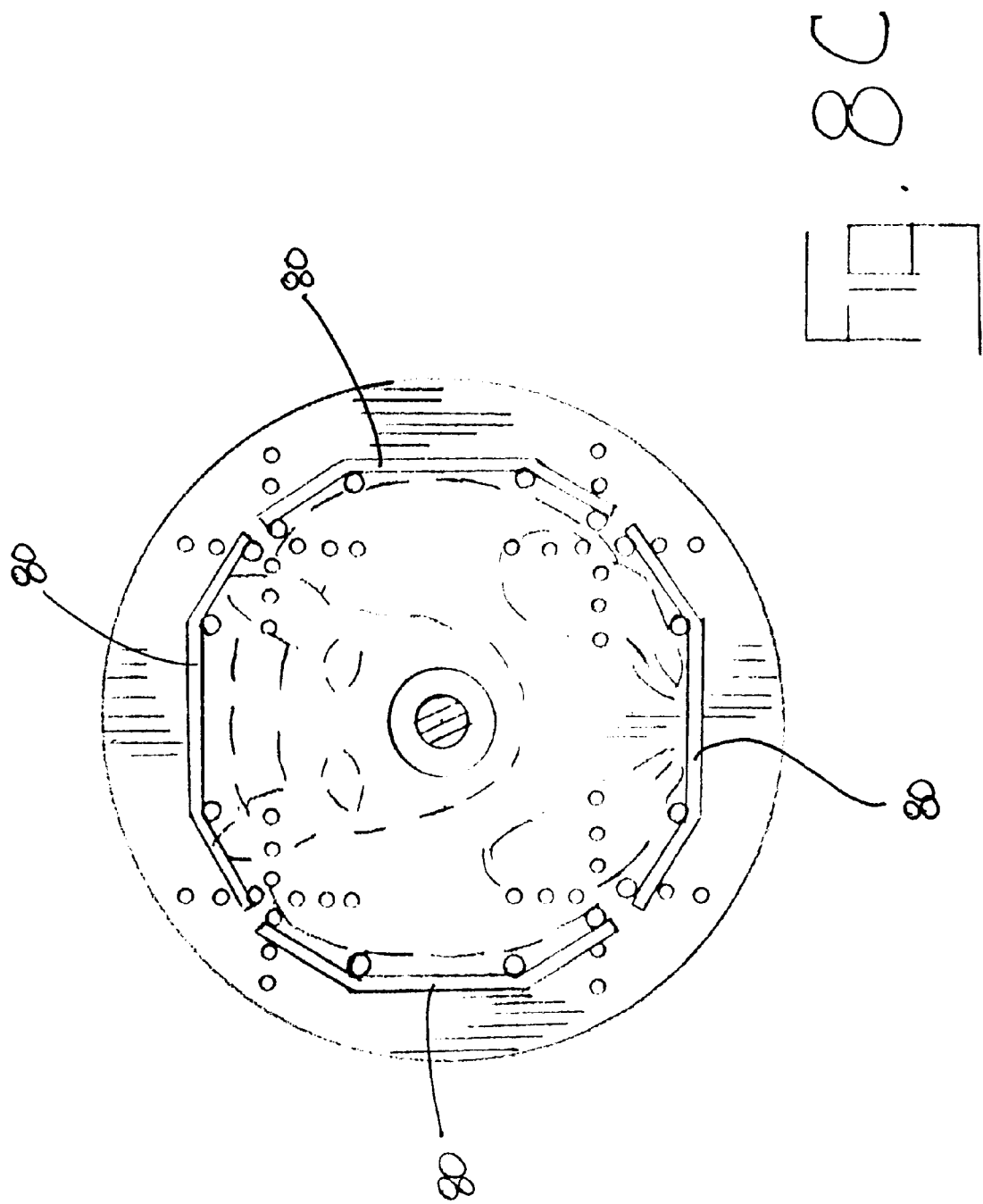

Thus, with reference to FIGS. 8A–8C, it should be appreciated that the cooking grates 80 can accommodate various sizes and configurations of food to be cooked. With reference first to FIG. 8A, two cooking grates 80 can be positioned in opposing relation to each other, and in close proximity thereto to accommodate such food as chicken or ribs to be barbecued. With respect to FIG. 8B, a similar configuration of the grates 80 is shown, but spread apart from each other in a greater distance to accommodate larger food such as a turkey or ham. Finally, as shown in FIG. 8C, four grates can be positioned as shown, with one grate in each column of apertures 70 for a large item such as a hog to be barbecued.

Thus, as designed, the present invention finds numerous advantages over those mechanisms shown in the prior art.

Firstly, the mechanism is easier to load with food to be cooked, due to the ability of the spit arm to be rotated toward the front side 120 of the barbecue mechanism. In this manner, the spit arm is moved to a position closer to the operator, and therefore the operator need not lift the food to be cooked and lean over the mechanism, which is not ergonomically suitable, nor is it healthy as having to lean over the cooking area becomes quite hot for the operator. An ancillary advantage to the spit arm moving toward the operator is that the cover can be made in a smaller movable section, as the entire grill area need not be exposed. Since the spit arm is movable towards the front side of the barbecue mechanism, the cover portion can expose the entire spit arm when it is fully rotated forward to the position shown in FIG. 5. Furthermore, as configured, the mechanism can accommodate numerous sizes of food to be cooked.

As shown in FIG. 9, an alternate embodiment of the invention is shown where a double spit arm unit is shown generally at 202 which comprises a lower casing member 204 having two drive assemblies 208 where each of the drive assemblies includes a linkage arm 228 for rotating between the cooking position shown in FIG. 9 to an outward position for loading purposes (not shown). It should be appreciated that the double spit arm barbecue mechanism is made possible because of the retractable spit arm. That is, since the linkage arm can be rotated outwardly to a position away from the cooking area, the cover need not open to a great extent to expose the spit arm, but rather, need only expose the spit arm when in the forward position. This enables both sides of the barbecue for access to the spit arms 236.

What is claimed is:

1. A barbecue rotisserie assembly, comprising a lower casing member, a spit arm having a longitudinal axis and profiled for receiving food to be cooked, and a drive mechanism which imparts rotational movement to said spit arm about its longitudinal axis, so as to rotate the food while cooking, said spit arm being movable in a direction transverse to said longitudinal axis, between a loading position and a cooking position.

2. The assembly of claim 1, wherein said spit arm is mounted between two linkage arms, said linkage arms having their pivotal axes fixed at one end thereof, and the opposite ends of said linkage arms being operatively connected to said spit arm, whereby said spit arm is movable in said transverse direction by way of said linkage arms.

3. The assembly of claim 2, wherein said drive mechanism is comprised of a gear drive mechanism.

4. The assembly of claim 3, wherein said gear drive mechanism includes a motor, a shaft driven by said motor, and a first gear member driven by said shaft.

5. The assembly of claim 4, wherein said shaft extends through an end section of at least one of said linkage arms, so that said one linkage arm is pivotably mounted to said shaft.

6. The assembly of claim 5, wherein said first gear member is attached to said shaft and a second gear member to said spit arm, with a chain drive extending around said gear members to drive said spit arm.

7. The assembly of claim 6, further comprising stop members profiled for defining the stopping position extremes for said linkage arms.

8. The assembly of claim 1, further comprising a cover member, pivotally mounted to said casing member, movable between an open position and a closed position.

9. The assembly of claim 8, wherein the cover member is comprised of two similarly shaped halves which cooperate to define a full cover member when closed, and which overlappingly cooperate when in the open position.

10. The assembly of claim 9, further comprising a shelf mounted to said casing member towards a front side to assist in loading said food items.

11. A barbecue rotisserie assembly, comprising a lower casing member profiled for containing the heating medium for the cooking process, a rotatable spit arm profiled for receiving food to be cooked, and a cover member profiled to enclose said casing for proper cooking conditions, said lower casing member having a front side accessible to said rotatable spit arm, said cover member comprising a first rearwardly disposed and relatively fixed section, and a second rotational section adjacent said front side, rotatable to access a food loading area, said spit arm being movable towards said front side into said food loading area for loading the food, and rearwardly away from said front side into a cooking position.

12. The assembly of claim 11, wherein said second rotatable section is mounted relative to a pivot axis, such that upon opening movement, the weight distribution relative to the pivot axis changes to ease the opening movement the further said second section is moved.

13. The assembly of claim 11, wherein said cover member is shaped as a laterally extending semi-cylinder when in the closed position.

14. The assembly of claim 13, wherein said first and second cover sections are comprised of two similarly shaped halves which cooperate to define said semi-cylinder when closed and which overlappingly cooperate upon opening movement.

15. The barbecue rotisserie assembly of claim 11, further comprising a drive mechanism which imparts rotational movement to said spit arm, so as to rotate said food while cooking.

16. The assembly of claim 11, wherein said spit arm is mounted between two linkage arms, said linkage arms having pivotal axes fixed at one end thereof, and the opposite ends of said linkage arms being operatively connected to said spit arm, whereby said spit arm is movable by way of said linkage arms.

17. The assembly of claim 16, wherein said drive mechanism is a gear drive mechanism comprised of a motor, a shaft driven by said motor, and a first gear member driven by said shaft.

18. The assembly of claim 17, wherein said shaft extends through an end section of at least one of said linkage arms, so that said one linkage arm is pivotably mounted to said shaft.

19. The assembly of claim 17, including a second gear member and wherein one of said gear members is attached to said shaft and the other to said spit arm, with a chain drive extending around said gear members to drive said spit arm.

20. The assembly of claim 19, further comprising stop members profiled for defining the stopping position extremes for said linkage arms.

21. A barbecue rotisserie assembly, comprising a lower casing member profiled for containing the heating medium for the cooking process, a rotatable spit arm profiled for receiving food to be cooked, and a cover member profiled to enclose said casing for proper cooking conditions, said lower casing member having an outer side accessible to said rotatable spit arm, said spit arm being movable from a rearward position adjacent a center of the lower casing member, to a forward position proximate an outer wall of the lower casing member.

22. The barbecue rotisserie assembly according to claim 21, further comprising a cover assembly including a multi-part assembly which covers the entirety of the grill area, including a movable part which can be opened to access the spit arm.

23. The barbecue rotisserie assembly according to claim 22, wherein the cover pivots about a fixed cover part.

24. The barbecue rotisserie assembly according to claim 23, wherein the cover pivot has a vertical centerline which is proximate to a vertical centerline of the spit arm, when in the rearward position.

* * * * *